(12) United States Patent
Chen

(10) Patent No.: US 7,149,383 B2
(45) Date of Patent: Dec. 12, 2006

(54) OPTICAL SYSTEM WITH REDUCED BACK REFLECTION

(75) Inventor: Bo Su Chen, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/781,466

(22) Filed: Feb. 17, 2004

(65) Prior Publication Data

US 2004/0264855 A1  Dec. 30, 2004

Related U.S. Application Data

(63) Continuation-in-part of application No. 10/610,256, filed on Jun. 30, 2003, now Pat. No. 6,961,489.

(51) Int. Cl.
   G02B 6/32 (2006.01)
   G02B 6/26 (2006.01)

(52) U.S. Cl. .......................... 385/33; 385/15; 385/31; 385/38; 385/39; 250/227.11; 250/227.2; 250/227.28

(58) Field of Classification Search .................. 385/31, 385/33–35, 39, 50, 88, 140; 356/364, 369, 356/121, 123, 127; 359/364, 577, 584, 711, 359/724, 727–728; 250/227.2, 227.28
See application file for complete search history.

(56) References Cited

U.S. PATENT DOCUMENTS

| | | | |
|---|---|---|---|
| 3,271,631 A | | 9/1966 | Marinace |
| 3,936,742 A | | 2/1976 | Krause |
| 3,947,093 A | * | 3/1976 | Goshima et al. ............. 359/716 |
| 4,021,099 A | * | 5/1977 | Kawasaki et al. ............ 385/35 |
| 4,317,085 A | | 2/1982 | Burnham et al. |
| 4,357,104 A | * | 11/1982 | Davinson .................... 356/4.07 |
| 4,408,871 A | | 10/1983 | Kojima |
| 4,466,694 A | | 8/1984 | MacDonald |
| 4,490,618 A | | 12/1984 | Cielo |
| 4,660,207 A | | 4/1987 | Svilans |
| 4,675,058 A | | 6/1987 | Plaster |
| 4,678,269 A | | 7/1987 | Pace |
| 4,681,414 A | | 7/1987 | Hershet |
| 4,755,036 A | | 7/1988 | Suzuki et al. |
| 4,765,703 A | | 8/1988 | Suzuki et al. |
| 4,784,722 A | | 11/1988 | Liau et al. |

(Continued)

FOREIGN PATENT DOCUMENTS

DE    4240706 A1    6/1994

(Continued)

OTHER PUBLICATIONS

Banwell, et al., "VCSE Laser Transmitter for Parallel Data Links," *IEEE Journal of Quantum Electronics*, vol. 29, No. 2, Feb. 1993, pp. 635-644.

(Continued)

*Primary Examiner*—Frank G. Font
*Assistant Examiner*—Ryan Lepisto
(74) *Attorney, Agent, or Firm*—Workman Nydegger

(57) ABSTRACT

An optical system is adapted to produce reduced back reflection from a receiving detector back to a light source for increased system performance. The system may optically condition light signals from the light source for projection onto the detector. The conditioning may result in a light spot on the detector that has an annular intensity distribution or profile. The annular distribution may be attained in any number of ways including providing a slope discontinuity in the lens surface, providing an ax icon lens function, and/or providing a defocused light spot on the detector surface.

20 Claims, 5 Drawing Sheets

U.S. PATENT DOCUMENTS

| | | | |
|---|---|---|---|
| 4,816,912 A | 3/1989 | Suzuki et al. | |
| 4,818,058 A | 4/1989 | Bonanni | |
| 4,829,537 A | 5/1989 | Baer | |
| 4,842,390 A | 6/1989 | Sottini et al. | |
| 4,885,592 A | 12/1989 | Kofol et al. | |
| 4,894,785 A | 1/1990 | Fernandes | |
| 4,901,327 A | 2/1990 | Bradley | |
| 4,935,029 A | 6/1990 | Matsutani et al. | |
| 4,943,128 A | 7/1990 | Takada et al. | |
| 4,943,970 A | 7/1990 | Bradley | |
| 4,956,844 A | 9/1990 | Goodhue et al. | |
| 4,961,622 A * | 10/1990 | Gorman et al. | 385/33 |
| 4,976,727 A | 12/1990 | Matsutani et al. | |
| 5,001,323 A | 3/1991 | Matsutani et al. | |
| 5,029,101 A | 7/1991 | Fernandes | |
| 5,029,973 A | 7/1991 | Rink | |
| 5,031,187 A | 7/1991 | Orenstein et al. | |
| 5,047,076 A | 9/1991 | Cognolato et al. | |
| 5,052,016 A | 9/1991 | Mahbobzadeh | |
| 5,056,098 A | 10/1991 | Anthony et al. | |
| 5,062,115 A | 10/1991 | Thornton | |
| 5,068,869 A | 11/1991 | Wang et al. | |
| 5,079,774 A | 1/1992 | Mendez et al. | |
| 5,115,442 A | 5/1992 | Lee et al. | |
| 5,117,469 A | 5/1992 | Cheung et al. | |
| 5,140,605 A | 8/1992 | Paoli et al. | |
| 5,157,537 A | 10/1992 | Rosenblatt et al. | |
| 5,158,908 A | 10/1992 | Blonder et al. | |
| 5,170,406 A | 12/1992 | Tidwell | |
| 5,212,706 A | 5/1993 | Jain | |
| 5,216,263 A | 6/1993 | Paoli | |
| 5,216,680 A | 6/1993 | Magnusson et al. | |
| 5,237,581 A | 8/1993 | Asada et al. | |
| 5,245,622 A | 9/1993 | Jewell et al. | |
| 5,258,990 A | 11/1993 | Olbright et al. | |
| 5,262,360 A | 11/1993 | Holonyak, Jr. et al. | |
| 5,285,466 A | 2/1994 | Tabatabaie | |
| 5,293,392 A | 3/1994 | Shieh et al. | |
| 5,312,398 A | 5/1994 | Hobart et al. | |
| 5,317,170 A | 5/1994 | Paoli | |
| 5,317,587 A | 5/1994 | Ackley et al. | |
| 5,325,386 A | 6/1994 | Jewell et al. | |
| 5,331,654 A | 7/1994 | Jewell et al. | |
| 5,337,074 A | 8/1994 | Thornton | |
| 5,337,183 A | 8/1994 | Rosenblatt | |
| 5,349,599 A | 9/1994 | Larkins | |
| 5,351,256 A | 9/1994 | Schneider et al. | |
| 5,354,323 A | 10/1994 | Whitebook | |
| 5,359,447 A | 10/1994 | Hahn et al. | |
| 5,359,618 A | 10/1994 | Lebby et al. | |
| 5,363,397 A | 11/1994 | Collins et al. | |
| 5,373,520 A | 12/1994 | Shoji et al. | |
| 5,373,522 A | 12/1994 | Holonyak, Jr. et al. | |
| 5,376,580 A | 12/1994 | Kish et al. | |
| 5,386,426 A | 1/1995 | Stephens | |
| 5,390,209 A | 2/1995 | Vakhshoori | |
| 5,396,508 A | 3/1995 | Bour et al. | |
| 5,400,145 A | 3/1995 | Suita et al. | |
| 5,402,258 A | 3/1995 | Murakami et al. | |
| 5,404,373 A | 4/1995 | Cheng | |
| 5,404,869 A | 4/1995 | Parkyn, Jr. et al. | |
| 5,412,678 A | 5/1995 | Treat et al. | |
| 5,412,680 A | 5/1995 | Swirham et al. | |
| 5,414,600 A | 5/1995 | Strobl et al. | |
| 5,415,652 A | 5/1995 | Mueller et al. | |
| 5,416,044 A | 5/1995 | Chino et al. | |
| 5,428,634 A | 6/1995 | Bryan et al. | |
| 5,430,634 A | 7/1995 | Baker et al. | |
| 5,438,584 A | 8/1995 | Paoli et al. | |
| 5,446,754 A | 8/1995 | Jewell et al. | |
| 5,458,594 A | 10/1995 | Mueller et al. | |
| 5,465,263 A | 11/1995 | Bour et al. | |
| 5,467,104 A | 11/1995 | Burnes, III et al. | |
| 5,470,314 A | 11/1995 | Walimsky | |
| 5,475,701 A | 12/1995 | Hibbs-Brenner | |
| 5,491,344 A | 2/1996 | Kenny et al. | |
| 5,493,577 A | 2/1996 | Choquette et al. | |
| 5,495,576 A | 2/1996 | Ritchey | |
| 5,497,390 A | 3/1996 | Tanaka et al. | |
| 5,509,095 A | 4/1996 | Baker et al. | |
| 5,513,202 A | 4/1996 | Kobayashi et al. | |
| 5,530,709 A | 6/1996 | Waarts et al. | |
| 5,530,715 A | 6/1996 | Shieh et al. | |
| 5,555,255 A | 9/1996 | Kock et al. | |
| 5,557,626 A | 9/1996 | Grodinski et al. | |
| 5,561,683 A | 10/1996 | Kwon | |
| 5,567,980 A | 10/1996 | Holonyak, Jr. et al. | |
| 5,568,498 A | 10/1996 | Nilsson | |
| 5,568,499 A | 10/1996 | Lear | |
| 5,574,738 A | 11/1996 | Morgan | |
| 5,577,492 A | 11/1996 | Parkyn, Jr. et al. | |
| 5,581,571 A | 12/1996 | Holonyak, Jr. et al. | |
| 5,586,131 A | 12/1996 | Ono et al. | |
| 5,590,145 A | 12/1996 | Nitta | |
| 5,594,752 A | 1/1997 | Endriz | |
| 5,596,339 A | 1/1997 | Furness, III et al. | |
| 5,598,300 A | 1/1997 | Magnusson et al. | |
| 5,598,394 A * | 1/1997 | Hibino et al. | 369/112.2 |
| 5,600,126 A | 2/1997 | Appel et al. | |
| 5,606,572 A | 2/1997 | Swirhun et al. | |
| 5,613,769 A | 3/1997 | Parkyn, Jr. et al. | |
| 5,625,729 A | 4/1997 | Brown | |
| 5,642,376 A | 6/1997 | Olbright et al. | |
| 5,645,462 A | 7/1997 | Banno et al. | |
| 5,646,978 A | 7/1997 | Kem et al. | |
| 5,648,978 A | 7/1997 | Sakata | |
| 5,659,327 A | 8/1997 | Furness, III et al. | |
| 5,676,453 A | 10/1997 | Parkyn, Jr. et al. | |
| 5,677,920 A | 10/1997 | Waarts et al. | |
| 5,679,963 A | 10/1997 | Klem et al. | |
| 5,692,083 A | 11/1997 | Bennett | |
| 5,696,023 A | 12/1997 | Holonyak, Jr. et al. | |
| 5,699,373 A | 12/1997 | Uchida et al. | |
| 5,712,188 A | 1/1998 | Chu et al. | |
| 5,726,805 A | 3/1998 | Kaushik et al. | |
| 5,727,013 A | 3/1998 | Botez et al. | |
| 5,727,014 A | 3/1998 | Wang et al. | |
| 5,773,817 A * | 6/1998 | Kingsley et al. | 250/214.1 |
| 5,774,487 A | 6/1998 | Morgan | |
| 5,777,342 A | 7/1998 | Baer | |
| 5,778,018 A | 7/1998 | Yoshikawa et al. | |
| 5,781,575 A | 7/1998 | Nilsson | |
| 5,784,399 A | 7/1998 | Sun | |
| 5,790,576 A | 8/1998 | Waarts et al. | |
| 5,790,733 A | 8/1998 | Smith et al. | |
| 5,793,783 A | 8/1998 | Endriz | |
| 5,799,543 A | 9/1998 | Nagai et al. | |
| 5,802,092 A | 9/1998 | Endriz | |
| 5,805,624 A | 9/1998 | Yang et al. | |
| 5,806,955 A | 9/1998 | Parkyn, Jr. et al. | |
| 5,815,318 A * | 9/1998 | Dempewolf et al. | 359/653 |
| 5,818,066 A | 10/1998 | Duboz | |
| 5,828,684 A | 10/1998 | Van de Walle | |
| 5,832,055 A | 11/1998 | Dewaele | |
| 5,836,667 A | 11/1998 | Baker et al. | |
| 5,838,705 A | 11/1998 | Shieh et al. | |
| 5,838,715 A | 11/1998 | Corzine et al. | |
| 5,861,955 A | 1/1999 | Gordon | |
| 5,866,911 A | 2/1999 | Baer | |
| 5,892,784 A | 4/1999 | Tan et al. | |
| 5,892,787 A | 4/1999 | Tan et al. | |
| 5,896,408 A | 4/1999 | Corzine et al. | |
| 5,901,166 A | 5/1999 | Nitta et al. | |
| 5,903,588 A | 5/1999 | Guenter et al. | |

| | | |
|---|---|---|
| 5,903,589 A | 5/1999 | Jewell |
| 5,903,590 A | 5/1999 | Hadley et al. |
| 5,908,408 A | 6/1999 | McGary et al. |
| 5,936,266 A | 8/1999 | Holonyak, Jr. et al. |
| 5,936,777 A | 8/1999 | Dempewolf |
| 5,940,422 A | 8/1999 | Johnson |
| 5,952,668 A | 9/1999 | Baer |
| 5,953,362 A | 9/1999 | Pamulapati et al. |
| 5,978,401 A | 11/1999 | Morgan |
| 5,978,408 A | 11/1999 | Thornton |
| 5,993,466 A | 11/1999 | Yoon |
| 5,993,467 A | 11/1999 | Yoon |
| 5,995,531 A | 11/1999 | Gaw et al. |
| 5,998,215 A | 12/1999 | Prather et al. |
| 6,002,705 A | 12/1999 | Thornton |
| 6,008,675 A | 12/1999 | Handa |
| 6,008,781 A | 12/1999 | Furness, III et al. |
| 6,014,395 A | 1/2000 | Jewell |
| 6,043,104 A | 3/2000 | Uchida et al. |
| 6,046,065 A | 4/2000 | Goldstein et al. |
| 6,055,262 A | 4/2000 | Cox et al. |
| 6,060,743 A | 5/2000 | Sugiyama et al. |
| 6,075,650 A | 6/2000 | Morris et al. |
| 6,078,601 A | 6/2000 | Smith |
| 6,086,263 A | 7/2000 | Selli et al. |
| 6,133,590 A | 10/2000 | Ashley et al. |
| 6,139,517 A | 10/2000 | Macoviak |
| 6,144,682 A | 11/2000 | Sun |
| 6,154,480 A | 11/2000 | Magnusson et al. |
| 6,160,916 A | 12/2000 | Horiuchi |
| 6,185,241 B1 | 2/2001 | Sun |
| 6,186,648 B1 | 2/2001 | Baker et al. |
| 6,191,890 B1 | 2/2001 | Baets et al. |
| 6,208,681 B1 | 3/2001 | Thornton |
| 6,212,312 B1 | 4/2001 | Grann et al. |
| 6,222,864 B1 | 4/2001 | Waarts et al. |
| 6,238,944 B1 | 5/2001 | Floyd |
| 6,254,563 B1 | 7/2001 | Macoviak et al. |
| 6,259,104 B1 | 7/2001 | Baer |
| 6,269,109 B1 | 7/2001 | Jewell |
| 6,297,068 B1 | 10/2001 | Thornton |
| 6,302,596 B1 | 10/2001 | Cohen et al. |
| 6,317,103 B1 | 11/2001 | Furness, III et al. |
| 6,324,326 B1 | 11/2001 | Dejneka et al. |
| 6,339,496 B1 | 1/2002 | Koley et al. |
| 6,349,159 B1 * | 2/2002 | Uebbing et al. ............... 385/33 |
| 6,356,572 B1 | 3/2002 | Tanaka et al. |
| 6,366,338 B1 | 4/2002 | Masubuchi et al. |
| 6,369,403 B1 | 4/2002 | Holonyak, Jr. |
| 6,372,533 B1 | 4/2002 | Jayaraman et al. |
| 6,392,257 B1 | 5/2002 | Ramdani et al. |
| 6,410,213 B1 | 6/2002 | Raguin et al. |
| 6,410,941 B1 | 6/2002 | Taylor et al. |
| 6,411,638 B1 | 6/2002 | Johnson et al. |
| 6,411,835 B1 | 6/2002 | Modell et al. |
| 6,427,066 B1 | 7/2002 | Grube |
| 6,455,879 B1 | 9/2002 | Ashley et al. |
| 6,459,709 B1 | 10/2002 | Lo et al. |
| 6,459,713 B1 | 10/2002 | Jewell |
| 6,462,360 B1 | 10/2002 | Higgins, Jr. et al. |
| 6,469,835 B1 * | 10/2002 | Liu ............................ 359/641 |
| 6,472,694 B1 | 10/2002 | Wilson et al. |
| 6,477,285 B1 | 11/2002 | Shanley |
| 6,487,230 B1 | 11/2002 | Boucart et al. |
| 6,487,231 B1 | 11/2002 | Boucart et al. |
| 6,490,311 B1 | 12/2002 | Boucart et al. |
| 6,493,371 B1 | 12/2002 | Boucart et al. |
| 6,493,372 B1 | 12/2002 | Boucart et al. |
| 6,493,373 B1 | 12/2002 | Boucart et al. |
| 6,496,621 B1 * | 12/2002 | Kathman et al. ............. 385/31 |
| 6,498,358 B1 | 12/2002 | Lach et al. |
| 6,501,973 B1 | 12/2002 | Foley et al. |
| 6,515,308 B1 | 2/2003 | Kneissl et al. |
| 6,535,541 B1 | 3/2003 | Boucart et al. |
| 6,536,959 B1 | 3/2003 | Kuhn et al. |
| 6,052,398 A1 | 4/2003 | Brillouet et al. |
| 6,542,531 B1 | 4/2003 | Sirbu et al. |
| 6,567,435 B1 | 5/2003 | Scott et al. |
| 6,822,794 B1 * | 11/2004 | Coleman et al. ............. 359/565 |
| 2001/0004414 A1 | 6/2001 | Kuhn et al. |
| 2002/0154675 A1 | 10/2002 | Deng et al. |
| 2003/0053751 A1 * | 3/2003 | Ukrainczyk et al. ........... 385/33 |
| 2003/0067049 A1 * | 4/2003 | Steinberg et al. ............ 257/466 |
| 2003/0072526 A1 * | 4/2003 | Kathman et al. .............. 385/31 |
| 2003/0113231 A1 * | 6/2003 | Karube et al. ............ 422/82.05 |
| 2003/0138210 A1 * | 7/2003 | Steinberg et al. .............. 385/38 |
| 2004/0126059 A1 * | 7/2004 | Bhagavatula et al. .......... 385/33 |

FOREIGN PATENT DOCUMENTS

| | | |
|---|---|---|
| EP | 0288184 A2 | 10/1988 |
| EP | 0776076 A1 | 5/1997 |
| GB | 2178554 A * | 2/1987 |
| JP | 60123084 | 1/1985 |
| JP | 02054981 | 2/1990 |
| JP | 5299779 | 11/1993 |
| WO | WO 98/57402 | 12/1998 |

OTHER PUBLICATIONS

Bowers, et al., "Fused Vertical Cavity Lasers with Oxide Aperture," Final Report for MICRO Project 96-042, Industrial Sponsor: Hewlett Packard, 4 pages, 1996-97.

Catchmark, et al., "High Temperature Configuration Wizard Operation of Vertical Cavity Top Surface-Emitting Lasers," CLEO 1993, p. 138.

Chemla, et al., "Nonlinear Optical Properties of Semiconductor Quantum Wells," *Optical Nonlinearities and Instabilities Semiconductors*, Academic Press, Inc., Copyright 1988, pp. 83-120.

Choe, et al., "Lateral Oxidation of AlAs Layers at Elevated Water Vapor Pressure Using a Closed-Chamber System," Letter to the Editor, Semiconductor Science Technology, Aug. 15, 2000, pp. L35-L38.

Choa, et al., "High-Speed Modulation of Vertical-Cavity Surface-Emitting Lasers," *IEEE Photonics Technology Letter*, vol. 3, No. 8, Aug. 1991, pp. 697-699.

Choquette, et al., "High Single Mode Operation from Hybrid Ion Implanted/Selectively Oxidized VCSELs," 200 IEEE 17th International Semiconductor Laser Conference, Monterrey, CA pp. 59-60.

Choquette, et al., "Lithographically-Defined Gain Apertures within Selectively Oxidized VCSELs," Paper CtuL6, Conference on Lasers and Electro-Optics, San Francisco, California (2002).

Choquette, et al., "VCSELs in Information Systems: 10Gbps$^{-1}$ Oxide VCSELs for Data Communication," Optics in Information Systems, vol. 12, No. 1, p.5, SPIE International Technical Group Newsletter, Apr. 2001.

Chua, et al., "Low-Threshold 1.57- μm VC-SEL's Using Strain-Compensated Quantum Wells and Oxide/Metal Backmirror," IEEE Photonics Technology Letters, vol. 7, No. 5, pp. 444-446, May 1995.

Chua, et al., "Planar Laterally Oxidized Vertical-Cavity Lasers for Low-Threshold High-Density Top-Surface-Emitting Arrays," IEEE Photonics Technology Letters, vol. 9, No. 8, Aug. 1997, pp 1060-1062.

Cox, J. A., et al., "Guided Mode Grating Resonant Filters for VCSEL Applications," *Proceedings of the SPIE*, The International Society for Optical Engineering, Diffractive and Holographic Device Technologies and Applications V, San Jose, California, vol., 3291, Jan. 28-29, 1998, pp. 70-71.

Farrier, Robert G., "Parametric Control for Wafer Fabrication: New CIM Techniques for Data Analysis," Solid State Technology, Sep. 1997, pp. 99-105.

Fushimi, et al., "Degradation Mechanism in Carbon-Doped GaAs Minority-Carrier Injection Devices," 34th Annual IRPS Proceedings, Dallas, TX, Apr. 29-May 2, 1996, 8 pages.

G.G. Ortiz, et al., "Monolithic Integration of In0.2 GA0.8 As Vertical Cavity Surface-Emitting Lasers with Resonance-Enhanced Quantum Well Photodetectors," *Electronics Letters*, vol. 32, No. 13, Jun. 20, 1996, pp. 1205-1207.

G. Shtengel, et al., "High-Speed Vertical-Cavity Surface-Emitting Lasers," *Photonics Technology Letters*, vol. 5, No. 12, Dec. 1993, pp. 1359-1361.

Geib, et al., "Comparison of Fabrication Approaches for Selectively Oxidized VCSEL Arrays," Proceeding of SPIE, vol. 3946, 2000, pp. 36-40.

Graf, Rudolph, *Modern Dictionary of Electronics*, 6th ed., Indiana: Howard W. Sams & Company, 1984, p. 694.

Guenter, et al., "Reliability of Proton-Implanted VCSELs for Data Communications," Invited Paper, SPIE, vol. 2683, OE LASE 96; Photonics West; Testing and Reliablity of Semiconductor Lasers, (SPIE, Bellingham, WA 1996).

Guenter, et al., "Commercialization of Honeywell's VCSEL Technology: Further Developments," Proceedings of the SPIE, vol. 4286, GSPIE 2000, 14 pages.

Hadley, et al., "High-Power Single Mode Operation from Hybrid Ion Implanted/Selectively Oxidized VCSELs," 13th Annual Meeting IEEE Lasers and Electro-Optics Society 2000 Annual Meeting (LEOS 2000), Rio Grande, Puerto Rico, pp. 804-805.

Hawthrone, et al., "Reliability Study of 850 nm VCSELs for Data Communications," IEEE, May 1996, pp. 1-11.

Herrick, et al., "Highly Reliable Oxide VCSELs Manufactured at HP/Agilent Technologies," Invited Paper, Proceedings of SPIE, vol. 3946, 2000, pp. 14-19.

Hibbs-Brenner, et al., "Performance, Uniformity and Yield of 850nm VCSELs Deposited by MOVPE," *IEEE Photonics Technology Letters*, vol. 8, No. 1, Jan. 1996, pp. 7-9.

Hideaki Saito, et al., "Controlling Polarization of Quantum-Dot Surface-Emitting Lasers By Using Structurally Anisotropic Self-Assembled Quantum Dots," American Institute of Physics, *Applied Physics Letters*, 71 (5), Aug. 4, 1997, pp. 590-592.

Hornak, et al., "Low-Temperature (10K-300K) Characterization of MOVPE-Grown Vertical-Cavity Surface-Emitting Lasers," *Photonics Technology Letters*, vol. 7, No. 10, Oct. 1995, pp. 1110-1112.

Huffaker, et al., "Lasing Characteristics of Low Threshold Microcavity Layers Using Half-Wave Spacer Layers and Lateral Index Confinement," *Applied Physics Letters*, vol. 66, No. 14, Apr. 3, 1995, pp. 1723-1725.

Jewell, et al., "Surface Emitting Microlasers for Photonic Switching & Intership Connections," *Optical Engineering*, vol. 29, No. 3, Mar. 1990, pp. 210-214.

Jiang, et al., "High-Frequency Polarization Self-Modulation in Vertical-Cavity Surface-Emitting Lasers," *Applied Physics Letters*, vol. 63, No. 26, Dec. 27, 1993, pp. 2545-2547.

K.L. Lear, et al., "Selectively Oxidized Veritcal Cavity Surface-Emitting Lasers with 50% Power Conversion Efficiency," *Electronic Letter*, vol. 31, No. 3, Feb. 2, 1995, pp. 208-209.

Kash, et al., "Recombination in GaAs at the AlAs Oxide-GaAs Interface," *Applied Physics Letters*, vol. 67, No. 14, Oct, 2, 1995, pp. 2022-2024.

Kishino, et al., "Resonant Cavity-Enhanced (RCE) Photodetectors," *IEEE Journal of Quantum Electronics*, vol. 27, No. 8, pp. 2025-2034.

Koley, B., et al., "Dependence of Lateral Oxidation Rate on Thickness of AlAs Layer of Interest as a Current Aperture in Vertical-Cavity Surface-Emitting Laser Structures," Journal of Applied Physics, vol. 84, No. 1, Jul. 1, 1998, pp. 600-605.

Kuchibhotla, et al., "Low-Voltage High Gain Resonant-Cavity Avalanche Photodiode," *IEEE Photonics Technology Letters*, vol. 3, No. 4, pp. 354-356.

Lai, et al., "Design of a Tunable GaAs/AlGaAs Multiple-Quantum-Well Resonant Cavity Photodetector," *IEEE Journal of Quantum Electronics*, vol. 30, No. 1, pp. 108-114.

Lee, et al., "Top-Surface Emitting GaAs Four-Quantum-Well Lasers Emitting at 0-85 um," *Electronics Letters*, Vo. 24, No. 11, May 24, 1990, pp. 710-711.

Lehman, et al., "High Frequency Modulation Characteristics of Hybrid Dielectric/AlGaAs Mirror Singlemode VCSELs," *Electronic Letters*, vol. 31, No. 15, Jul. 20, 1995, pp. 1251-1252.

Maeda, et al., "Enhanced Glide of Dislocations in GaAs Single Crystals by Electron Beam Irradiation," Japanese Journal of Applied Physics, vol. 20, No. 3, Mar. 1981, pp. L165-L168.

Magnusson, "Integration of Guided-Mode Resonance Filters and VCSELs," Electro-Optics Research Center, Department of Electrical Engineering, University of Texas at Arlington, May 6, 1997.

Martinsson, et al., "Transverse Mode Selection in Large-Area Oxide-Confined Vertical-Cavity Surface-Emitting Lasers Using a Shallow Surface Relief," *IEEE Photonics Technology Letters*, 11(12), 1536-1538, (1999).

Miller, et al., "Optical Bistability Due to Increasing Absorption," *Optics Letters*, vol. 9, No. 5, May 1984, pp. 162-164.

Min Soo Park and Byung Tae Ahn, "Polarization Control of Vertical-Cavity Surface-Emitting Lasers by Electro-Optic Birefringence," *Applied Physics Letters*, vol. 76, No. 7, Feb. 14, 2000, pp. 813-815.

Morgan, et al., "2000 C, 96-nm Wavelength Range, Continuous-Wave Lasing from Unbonded GaAs MOVPE-Grown Vertical Cavity Surface-Emitting Lasers," *IEEE Photonics Technology Letters*, vol. 7, No. 5, May 1995, pp. 441-443.

Morgan, et al., "High-Power Coherently Coupled 8=8 Vertical Cavity Surface Emitting Laser Array," *Applied Physics Letters*, vol. 61, No. 10, Sep. 7, 1992, pp. 1160-1162.

Morgan, et al., "Hybrid Dielectric/AlGaAs Mirror Spatially Filtered Vertical Cavity Top-Surface Emitting Laser," *Applied Physics Letters*, vol. 66, No. 10, Mar. 6, 1995, pp. 1157-1159.

Morgan, et al., "Novel Hybrid-DBR Single-Mode Controlled GaAs Top-Emitting VCSEL with Record Low Voltage," 2 pages, dated prior to Dec. 29, 2000.

Morgan, et al., "One Watt Vertical Cavity Surface Emitting Laser," *Electronic Letter*, vol. 29, No. 2, pp. 206-207, Jan. 21, 1993.

Morgan, et al., "Producible GaAs-Based MOVPE-Grown Vertical-Cavity Top-Surface Emitting Lasers with Record Performance," *Electronic Letters*, vol. 31, No. 6, Mar. 16, 1995, pp. 462-464.

Morgan, et al., Progress and Properties of High-Power Coherent Vertical Surface Emitting Laser Arrays, SPIE, vol. 1850, Jan. 1993, pp. 100-108.

Morgan, et al., "Progress in Planarized Veritcal Cavity Surface Emitting Laser Devices and Arrays," SPIE, vol. 1562, Jul. 1991, pp. 149-159.

Morgan, et al., "Spatial-Filtered Vertical-Cavity Top Surface -Emitting Lasers," CLEO, 1993, pp. 138-139.

Morgan, et al., "Submilliamp, Low-Resistance, Continuous-Wave, Single-Mode GaAs Planar Vertical-Cavity Surface Emitting Lasers," Honeywell Technology Center, Jun. 6, 1995.

Morgan, et al., "Transverse Mode Control of Vertical-Cavity Top-surface Emitting Lasers," *IEEE Photonics Technology* Letters, vol. 4, No. 4, Apr. 1993, pp. 374-377.

Morgan, et al., "Vertical-Cavity Surface-Emitting Laser Arrays," Invited Paper, SPIE, vol. 2398, Feb. 6, 1995, pp. 65-93.

Morgan, et al., "Vertical-Cavity Surface Emitting Lasers Come of Age," Invited Paper, SPIE, vol. 2683, 0-8194-2057, Mar. 1996, pp. 18-29.

Morgan, et al., "High-Performance, Producible Vertical Cavity Lasers for Optical Interconnects," *High Speed Electronics and Systems*, vol. 5, No. 4, Dec. 1994, pp. 65-95.

Naone, R. L., et al., "Tapered-Apertures for High-Efficiency Miniature VCSELs," LEOS Newsletter, vol. 13, No. 4, Aug. 1999, pp. 1-5.

Nugent, et al., "Self-Pulsations in Vertical-Cavity Surface-Emitting Lasers," *Electronic Letters*, vol. 31, No. 1, Jan. 5, 1995, pp. 43-44.

Oh, T. H., et al., "Single-Mode Operation in Antiguided Vertical-Cavity Surface-Emitting Laser using a Low-Temperature Grown AlGaAs Dielectric Aperture," *IEEE Photonics Technology Letters*, 10(8), 1064-1066 (1998).

Osinski, et al., "Temperature and Thickness Dependence of Steam Oxidation of AlAs in Cylindrical Mesa Structure," *IEEE Photonics Technology Letters*, vol. 13, No. 7, Jul. 2001, pp. 687-689.

Peck, D. Stewart, "Comprehensive Model for Humidity Testing Correlation," IEEE/IRPS, 1986, pp. 44-50.

Ries, et al., "Visible-Spectrum ($\lambda$=650nm) Photopumped (pulsed, 300 K) Laser Operation of a Vertical-Cavity AlAs-AlGaAs/InAlP- InGaP Quantum Well Heterostructure Utilizing Native Oxide Mirrors," Applied Physics Letters, vol. 67, No. 8, Aug. 21, 1955, pp. 1107-1109.

S.S. Wang and R. Magnusson, "Multilayer Waveguide-Grating Filters," *Applied Optics*, vol. 34, No. 14, 1995, pp. 2414-2420.

S.S. Wang and R. Magnusson, "Theory and Applications of Guided-Mode Resonance Filters," *Applied Optics*, vol. 32, No. 14, 1993, pp. 2606-2013.

Sah, et al., "Carrier Generation and Recombination in *P-N* Junctions and *P-N* Junction Characteristics," Proceedings of the IRE, Sep. 1957, pp. 1228-1243.

Schubert, "Resonant Cavity Light-Emitting Diode," *Applied Physics Letters*, vol. 60, No. 8, Feb. 24, 1992, pp. 921-923.

Shi, et al., "Photoluminescence Study of Hydrogenated Aluminum Oxide-Semiconductor Interface," *Applied Physics Letters*, vol. 70, No., 10, Mar. 10, 1997, pp. 1293-1295.

Smith, R. E., et al., "Polarization-Sensitive Subwavelength Antireflection Surfaces on a Semiconductor for 975 NM," *Optics Letters*, vol. 21, No. 15, Aug. 1, 1996, pp. 1201-1203.

Spicer, et al., "The Unified Model for Schottky Barrier Formation and MOS Interface States in 3-5 Compounds," Applications of Surface Science, vol. 9, 1981, pp. 83-101.

Suning Tang, et al., "Design Limitations of Highly Parallel Free-Space Optical Interconnects Based on Arrays of Vertical Cavity Surface-Emitting Laser Diodes, Microlenses and Photodetectors," Journal of Lightwave Technology, vol. 12, No. 11, Nov. 1, 1994, pp. 1971-1975.

T. Mukaihara, "Polarization Control of Vertical-Cavity Surface-Emitting Lasers by a Birefringent Metal/Semiconductor Polarizer Terminating a Disturbed Bragg Reflector," Tokyo Institute of Technology, Precision and Intelligence Laboratory, pp. 183-184.

Tao, Andrea, "Wet-Oxidation of Digitally Alloyed AlGaAs," National Nanofabrication Users Network, Research Experience for Undergraduates 2000, 2 pages.

Tautm, et al., "Commercialization of Honeywell's VCSEL Technology," Published in Proceedings for the SPIE, vol. 3946, SPI, 2000, 12 pages.

Mukaihara, et al., "A Novel Birefingent Disturbed Bragg Reflector Using a Metal/Dielectric Polarizer for Polarization Control of Surface-Emitting Lasers," Japan J. Appl. Phys., vol. 33, (1994), Part 2, No. 2B, Feb. 15, 1994, pp. L227-L229.

Tu, Legacy interface-Wei et al., "Transparent Conductive Metal-Oxide Contacts in Vertical-Injection Top-Emitting Quantum Well Lasers," *Applied Physics Letters*, 58 (8), Feb. 25, 1991, pp. 790-792.

Wieder, H. H., "Fermi Level and Surface Barrier of $Ga_2In_{1-3}As$ Alloys," *Applied Physics Letters*, vol. 38, No. 3, Feb. 1, 1981, pp. 170-171.

Wipiejewski, et al., "VCSELs for Datacom Applications," Invited Pager, Part of the SPIE Conference on Vertical-Cavity Surface-Emitting Lasers III, San Jose, California, SPIE, vol. 3627, Jan. 1999, pp. 14-22.

Y.M. Yang, et al., "Ultralow Threshold Current Vertical Cavity Surface Emitting Lasers Obtained with Selective Oxidation," *Electronic Letter*, vol. 31, No. 11, May 25, 1995, pp. 886-888.

Yablonovitch, et al., "Photonic Bandgap Structures," *J. Opt. Soc. Am. B.*, vol. 10, No. 2, Feb. 1993, pp. 283-295.

Young, et al., "Enhanced performance of Offset-Gain High Barrier Vertical-Cavity Surface-Emitting Lasers," *IEEE J. Quantum Electron.*, vol. 29, No. 6, Jun. 1993, pp. 2013-2022.

U.S. Appl. No. 09/751,422, filed Dec. 29, 2000, entitled "Resonant Reflector for Use with Optoelectronic Devices."

U.S. Appl. No. 09/751,423, filed Dec. 29, 2000, entitled "Spatially Modulated Reflector for an Optoelectronic Device."

Athale, et al., "Incoherent Optical Image Processing with Acousto-Optic Pupil-Plane Filtering" *Applied Optics*, vol. 34, No. 2, Jan. 10, 1995, pp. 246-280.

\* cited by examiner

OPTICAL SYSTEM WITH REDUCED BACK REFLECTION

This application is a continuation-in-part of U.S. Ser. No. 10/610,256, filed Jun. 30, 2003, now U.S. Pat. No. 6,961,489 entitled "A High Speed Optical System", the entire contents of which are herein incorporated by reference.

BACKGROUND

The present invention relates to optical systems for delivering light from a light source to a destination such as a detector, and more particularly, to such systems that are adapted to reduce back reflection from the destination back to the light source.

Optical technology is used in a wide variety of fields including telecommunications, computers, and medical fields. In many applications, a light guide—such as an optical fiber—is used to deliver a light signal from a light source to a light detector. An important consideration in many of these systems is the optical coupling performance between the light source, the optical fiber, and the light detector. In many cases, the optical fiber is simply "butt-coupled" to the light source and/or light detector. While this may be adequate for some applications, it has been found that in some cases, some of the light that is delivered to the light detector is reflected by the light detector back into the optical fiber, and in some cases, back into the light source. Such back reflection can in some cases create significant noise. For example, it has been found that such back reflections can create optical feedback in some light sources, which can produce increased jitter and increased Reflective Intensity Noise (RIN). Back reflections can also cause interferometric noise in some light sources by converting some light source phase noise into light source intensity noise. For optical communications systems, this can result in increased bit error rates (BER), and reduced performance. For other applications, such as computer and medical applications, this noise can result in reduced system performance and/or reduced reliability.

SUMMARY

The present invention is directed to a method and apparatus for reducing back reflection into an optical system. In one illustrative embodiment, an optical element is provided between a light source and a light detector. The optical element is adapted to direct light delivered by the light source to the light detector. In some cases, the optical element is further adapted to reduce or prevent light that is reflected off the detector from substantially coupling back to the light source. This may be accomplished by, for example, including an ax icon type function in the optical element. It is contemplated that the light source may be an optoelectronic device, an optical fiber driven by an optoelectronic device, or any other light source, as desired.

In one illustrative embodiment, the optical element may include a plano-convex lens that has a flat side and a convex side. In this embodiment, the light source may be positioned adjacent to the flat side, and the detector may be positioned adjacent to but spaced from the convex side. The plano-convex lens may be configured to receive a light beam from the light source and produce an annular shaped light pattern on the detector surface. When the annular shaped light pattern strikes the detector, most of the light reflected by the detector surface will not be directed or focused back to the light source by the plano-convex lens. This may help reduce the optical feedback at the light source, which can reduce jitter and Reflective Intensity Noise (RIN) in the system. This may also reduce the interferometric noise at the light source. With the reduced noise, decreased bit error rates (BER), and increased performance may be achieved.

While an annular light pattern is described above in one illustrative embodiment, it is contemplated that any light pattern may be used that helps reduce the amount of back reflection that is coupled back into the light source. In many cases, this may correspond to a light pattern that has a reduced light intensity near the center of the light pattern, such as an annular, semi-annular or other like pattern.

Alternatively, or in addition, it is also contemplated that the optical element may have a focal length, and that the detector may be placed in front of or behind the focal point. This may help defocus the light at the detector, which may help reduce the amount of back reflection that is coupled back into the light source. The detector may also have an anti-reflective coating to further help reduce the amount of back reflection, if desired.

DESCRIPTION

Figure 1:
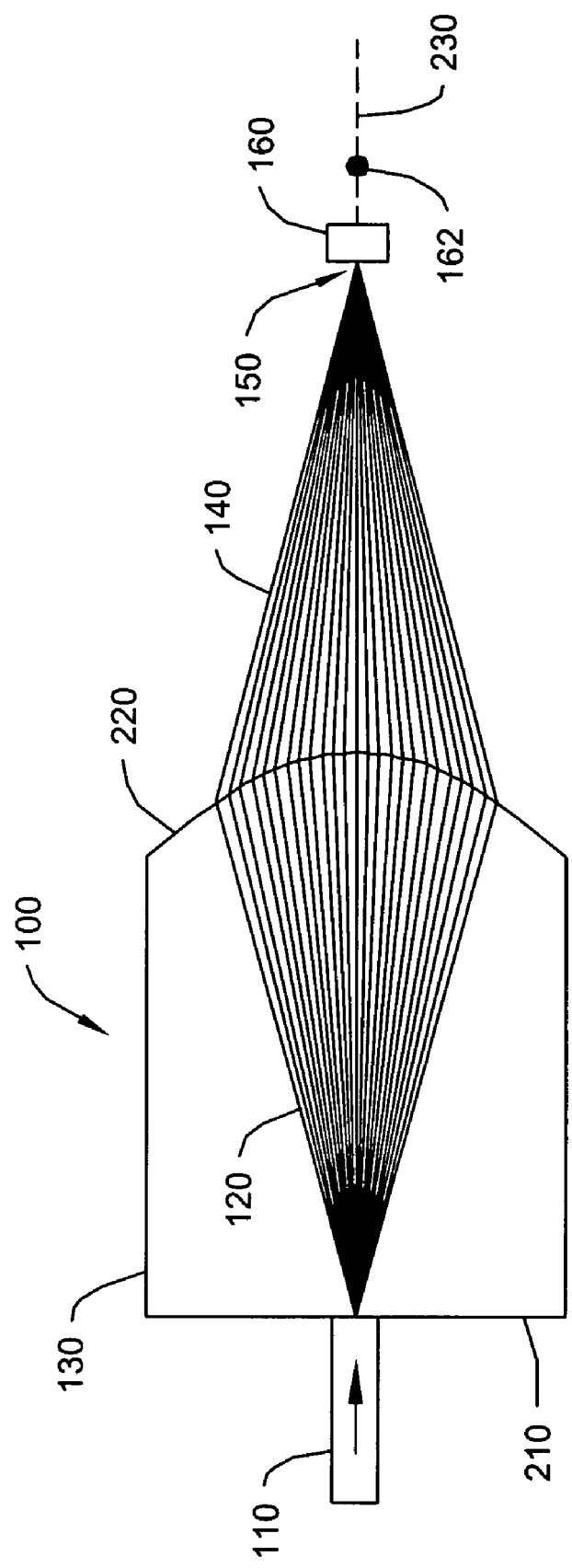
FIG. 1 is a schematic view of an optical system according to an illustrative embodiment of the present invention.

FIG. 1 is a schematic view of an optical system 100 according to an illustrative embodiment of the present invention. In the illustrative embodiment shown in FIG. 1, a light source 110 emits light rays 120, which pass through optical element 130. Suitable light sources include, for example, an optical fiber that delivers light, a laser such as a Vertical Cavity Surface Emitting Laser (VCSEL), a Light Emitting Diode (LED), or any other suitable device or element, or combination of suitable devices or elements, capable of producing or delivering light. After passing through optical element 130, light rays 140 impinge on the surface 150 of a detector 160. The detector 160 may be any suitable light detector, as desired.

Figure 2:
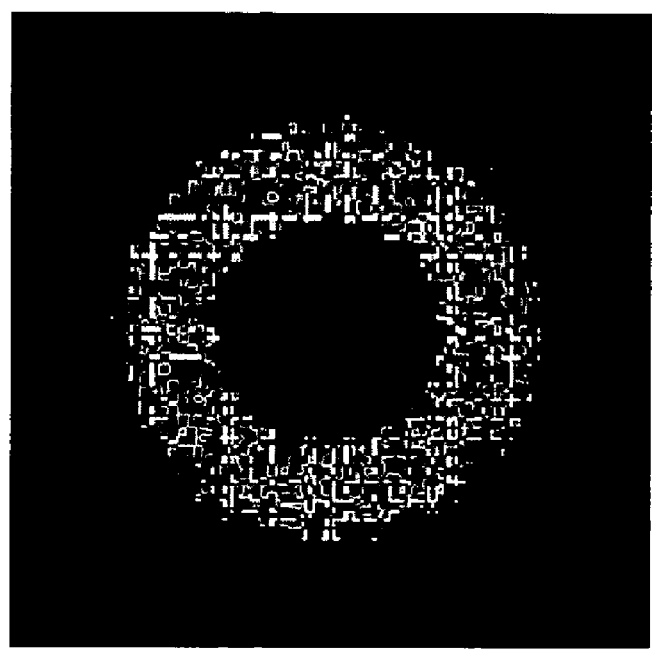
FIG. 2 is a spot diagram of an illustrative light pattern on the detector of FIG. 1.

In the illustrative embodiment, the light rays 120 are conditioned by the optical element 130 into light rays or signals 140, which form an annular light pattern on the detector surface 150, as better shown in FIG. 2. FIG. 2 shows a spot diagram of an illustrative light pattern produced by optical element 130 on the detector surface 150.

Figure 3:
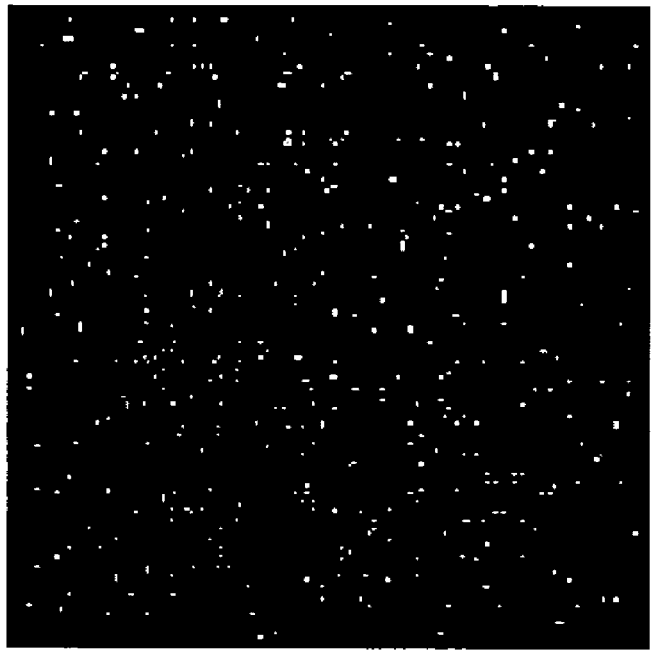
FIG. 3 is a spot diagram of an illustrative return spot on the light source of FIG. 1.

When the illustrative annular shaped light pattern (see FIG. 2) strikes the detector surface 150 of detector 160, most of the reflected light is not directed by the optical element 130 back to the light source 110, as shown by FIG. 3. FIG. 3 shows the back reflection or return spot on the light source 110. As can be seen, the back reflection is small (<10%), indicating that the optical feedback at the light source 110 is reduced, which can reduce jitter, Reflective Intensity Noise (RIN), and/or interferometric noise at the light source 110. As indicated above, this reduced back reflection noise may help provide a decreased bit error rate (BER) and/or an increase in performance of the optical system. More specifically, and in a fiber communications example, the reduced back reflection may help meet the return loss specification of Ethernet and fiber channels and improve the performance of the fiber communications system.

In the illustrative embodiment shown in FIG. 1, the optical element 130 is a plano-convex lens. The plano (i.e. flat) side 210 of the lens 130 may act as a fiber stop to a light source (e.g. fiber) 110. In some embodiments, the plano side 210 of the lens 130 may make physical contact with the fiber 110 facet. This physical contact may be maintained using spring loading. To help reduce back reflection caused by the boundary between the piano side 210 of the lens 130 and the fiber 110 facet, the index of refraction of the lens material may be selected to match or substantially match the index of the fiber 110 core. In one illustrative embodiment, the optical element 130 is one piece and made or molded from Ultem$^R$ 1010, which is a General Electric Company plastic. In some cases, an optical grease or optical adhesive may be placed between the plano side 210 of the lens 130 and the fiber 110 facet, if desired.

As shown in FIG. 2, the convex side 220 of the lens 130 may be configured to form an annular or ring spot pattern on the detector surface 150. When an annular shaped light pattern impinges on the detector surface 150, most of the reflected light will not be directed or focused by the plano-convex lens 130 back to the light source 110. This may help reduce the optical feedback to the light source, which can reduce jitter, Reflective Intensity Noise (RIN), and interferometric noise in the system. As such, decreased bit error rates (BER), and increased performance may be achieved.

While an annular light pattern is shown above in FIG. 2, it is contemplated that any light pattern that helps reduce the amount of back reflection that is coupled back into the light source 110 may be used. In many cases, this may correspond to a light pattern that has a reduced light intensity near the center of the light pattern on the detector surface 150. That is, in many cases, the optical element 130 may redistributed the power of the light source 110 from the center to the outskirts of the beam that is projected on to detector surface 150.

Alternatively, or in addition, it is contemplated that the optical element 130 may have a focal length that images the light from the light source 110 onto a focal point 162 or focal plane, as desired, and the detector 160 may be placed in front of or behind the focal point 162 or focal plane. This may help defocus the light at the detector surface 150, which may help reduce the amount of back reflection that is coupled back into the light source 110. The detector surface 150 may also have an anti-reflective (AR) coating to further help reduce the amount of back reflection, if desired. While the optical element 130 is shown as a plano-convex lens in FIG. 1, it is contemplated that the optical element 130 may be any optical element that produces a light pattern on the detector surface 150 that helps reduce the back reflection into the light source 110.

Attaining an annular distribution of light on the detector surface 150 may be achieved in any number of ways. For example, and in one illustrative embodiment, an axicon lens, also known as conical lens or rotationally symmetric prism, may be used to convert a parallel laser beam into a ring, a doughnut shaped ablation or an annular intensity profile.

Figure 4:
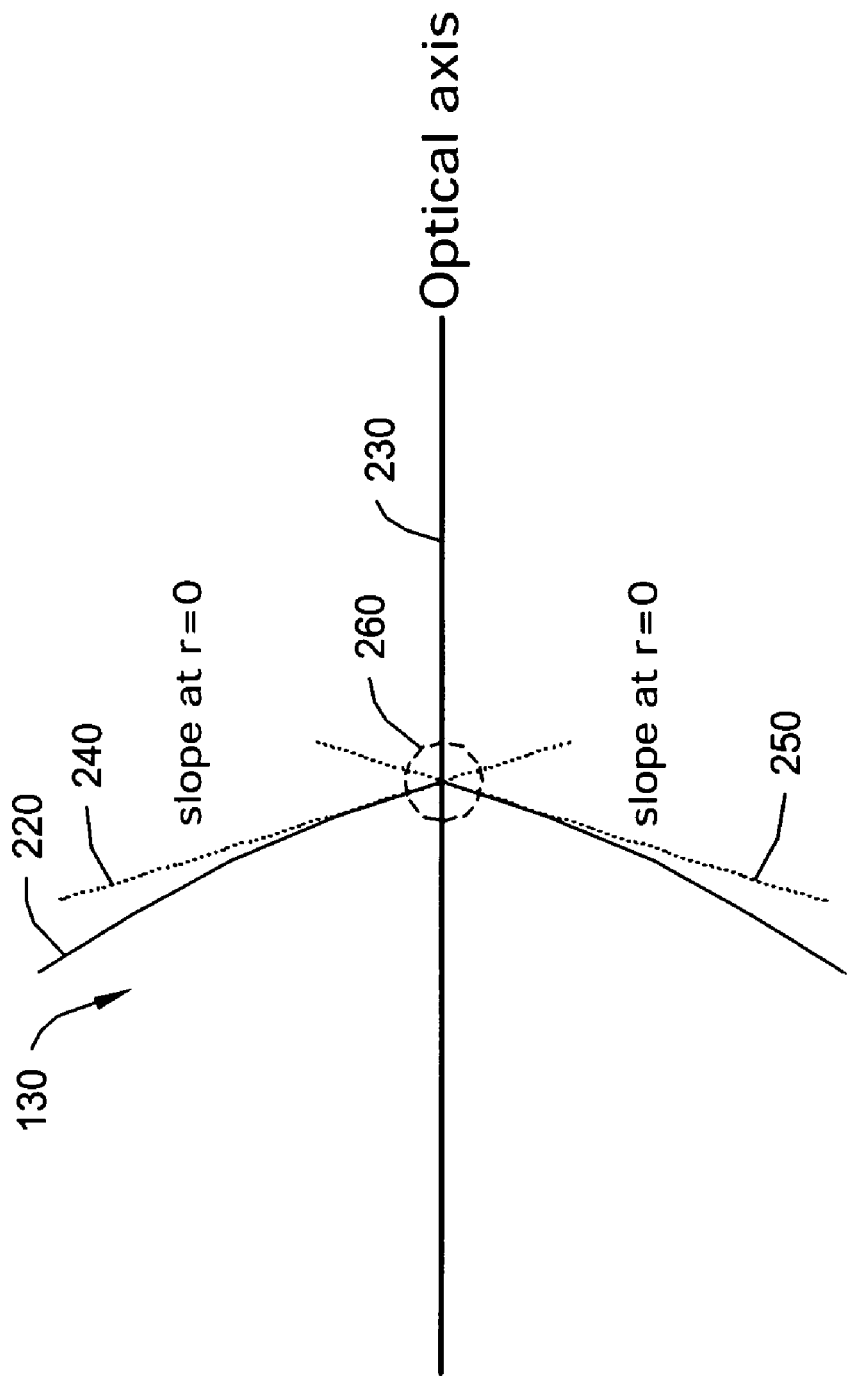
FIGS. 4 and 5 show cross-sectional views of lenses having slope discontinuities.
Figure 5:
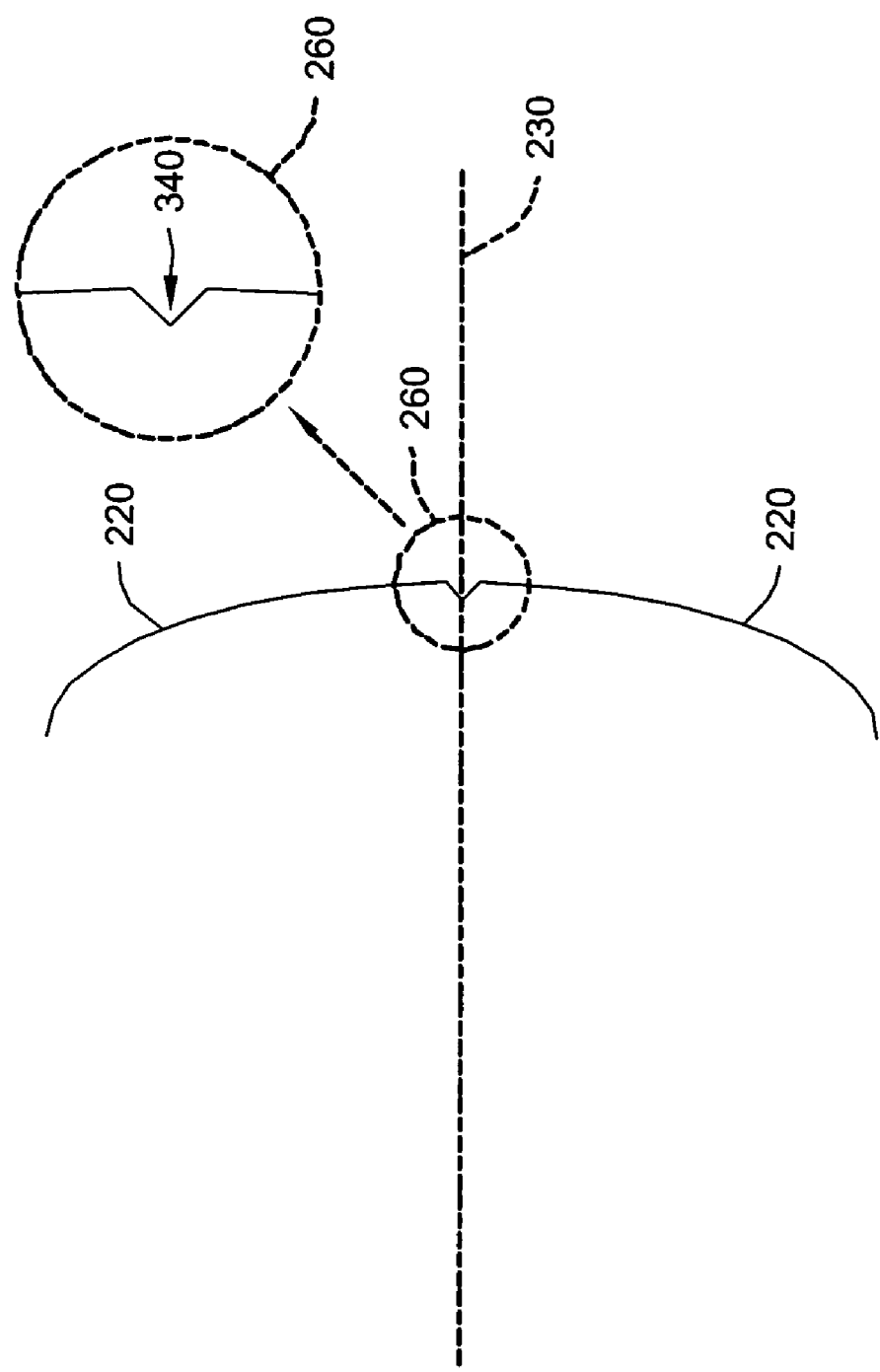

In some cases, an appropriate slope discontinuity may be provided in the surface 220 of the optical element 130 at or near the optical axis 230, although this is not required in all embodiments. The slope discontinuity may help provide the ax icon function to optical element 130. An illustrative surface 220 of an ax icon optical element having a slope discontinuity at optical axis 230 is shown in FIG. 4. Line 240 shows the slope of the upper part of surface 220 at optical axis 230 (r=0). Line 250 shows the slope of the lower part of surface 220 at optical axis 230. As one follows surface 220 across axis 230, there is a disruptive change of slope from slope 240 to slope 250. Slope discontinuities may be implemented in various ways. FIG. 5 shows a slope or curvature discontinuity 340 as a small notch-like shape, cusp, indentation or protrusion in surface 220 at area 260 about optical axis 230. Discontinuity 340 may be sharp, abrupt, rough or smooth. Discontinuity 340 may be of any shape or contour that helps enhance the ax icon function. Elsewhere, the slope may be continuous, such as a function of this distance from optical axis 230 or of the radius, except at optical axis 230. In some cases, slope discontinuity 340 of surface 220 may appear imperceptible to the eye. Apart from point or area 260, surface 220 may be aspherical or spherical, depending on the application.

Alternatively, or in addition, much or all of the surface 220 of optical element 130 may be configured such that an annular or ring pattern of light 140 is transmitted onto the detector surface 150 of detector 160. For example, the surface 220 may cone shaped, with the tip of the cone at the vertex of the surface. Surface 220 may also be rotationally symmetric about the optical axis (e.g. z axis), and described by a single parameter θ, where θ is the angle measured between the plane normal to the z axis at the vertex of the cone and the surface 220. The surface sag of the surface 220 may be defined by, for example:

$$z=\tan(\theta)r$$

where "z" is the surface sag and "r" is the radial coordinate in lens units.

Alternatively, the lens surface 220 may be defined by the following formulas, constants and variables:

$$z=\{cr^2/[1+(1-(1+k)c^2r^2)^{1/2}]\}+A_1r^1+A_2r^2$$

$$c=1/R;\ R=-0.3715\ mm$$

$$k=-1.171438E+008$$

$$A_1=0.01270$$

$$A_2=-0.7737\ mm^{-1}$$

In some illustrative embodiments, an annular light pattern may be produced on detector surface 150 by defocusing the light spot produced by the optical element 130 relative to the detector surface 150. In one illustrative embodiment, detector 160 may be positioned either in front of or behind the focus point or focal plane of optical element 130. This may cause an annular light intensity pattern on detector surface 150. The area of lower or no intensity in the center of the annular or ring distribution may be referred to as the dark spot of Arago in a well-corrected optic.

Figure 6:
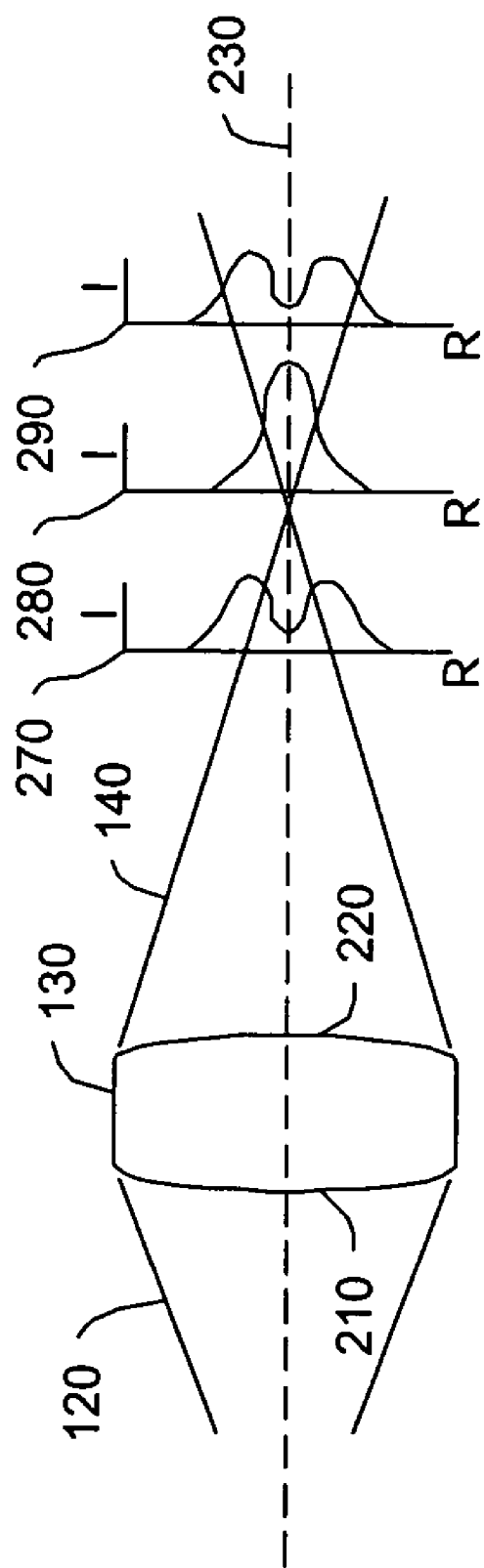
FIG. 6 reveals several focal adjustments of an optical element.

FIG. 6 reveals three focus positions of an illustrative optical element 130. Detector position 270 shows an annular intensity profile of light 140 launched on detector surface 150. The intensity is shown by coordinate I and the distance from the optical axis 230 is shown by coordinate R. Detector position 280 shows a profile having the intensity of light 140 concentrated on or near optical axis 230. Detector position 290 shows an annular intensity profile similar to the profile of detector position 270. Either detector position 270 or 290 may be used to achieve an annular or ring distribution of light intensity on the detector surface 150. It is contemplated that optical system 100 may incorporate either or both of the ax icon and defocusing components to attaining an annualar light pattern on the detector surface 150.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. An optical coupler comprising:
   an optical element having a substantially flat side and a substantially convex side;
   a detector spaced from the convex side of the optical element; and
   an optical fiber positioned adjacent to the substantially flat side of the optical element wherein the substantially flat side of the optical element is oriented substantially perpendicular to an optical axis associated with the optical coupler and the optical element is adapted to direct light delivered by the optical fiber to the spaced detector such that light that is reflected by the detector does not substantially couple back into the optical fiber wherein the optical element is adapted to produce at least a partial annular shaped light pattern on the detector.

2. The optical coupler of claim 1 wherein the optical fiber abuts the substantially flat side of the optical element.

3. An optical coupler according to claim 1 wherein the optical fiber includes a core that has an index of refraction that at least substantially matches an index of reaction of the optical element.

4. The optical coupler of claim 1, wherein the substantially convex side of the optical element has a discontinuous slope.

5. The light optical coupler of claim 4, wherein the substantially convex side of the optical element is grooved.

6. An optical coupler comprising:
   an optical element having a substantially flat side and a substantially convex side;
   a detector spaced from the convex side of the optical element; and
   an optical fiber positioned adjacent to the substantially flat side of the optical element wherein the substantially flat side of the optical element is oriented substantially perpendicular to an optical axis associated with the optical coupler and the optical element is adapted to direct light delivered by the optical fiber to the space detector such that light that is reflected by the detector does not substantially couple back into the optical fiber wherein the optical element is adapted to produce an annular light pattern on the detector.

7. An optical coupler comprising:
   an optical element having a substantially flat side and a substantially convex side;
   a detector spaced from the convex side of the optical element; and
   an optical fiber positioned adjacent to the substantially flat side of the optical element wherein the substantially flat side of the optical element is oriented perpendicular to an optical axis associated with the optical coupler and the optical element is adapted to direct light delivered by the optical fiber to the spaced detector such that light that is reflected by the detector does not substantially couple back into the optical fiber wherein the optical element includes a focal point and the detector is positioned relative to the optical element such that the light from the optical element is not defocused on the detector.

8. A light transmission system comprising:
   a light source;
   a detector; and
   an optical element positioned between the light source and the detector;
   wherein the optical element is configured to direct more than half of the light that is transmitted from the light source onto the detector, and to direct less than half of the light that is reflected by the detector back to the light source, and wherein the optical element is configured to produce an annular light pattern on the detector wherein the lens has a substantially plano-convex shape.

9. The light transmission system of claim 8 wherein said optical element has a focal point that is in front of the detector.

10. The light transmission system of claim 8 wherein said optical element has a focal point that is behind the detector.

11. The light transmission system of claim 8 wherein said optical element comprises a lens that is shaped to produce an annular light pattern on the detector.

12. The light transmission system of claim 8 wherein said light source includes an optical fiber.

13. The light transmission system of claim 8 wherein said light source includes a laser.

14. The light transmission system of claim 8 wherein said light source includes a Light Emitting Diode (LED).

15. The light transmission system of claim 8 wherein the optical element is further configured to diverge the light received from the light source as it is transmitted through the optical element.

16. The light transmission system of claim 8 wherein the light source abuts a surface of the optical element.

17. The light transmission system of claim 16 wherein the light source is an optical fiber and an index of refraction of the optical element matches or substantially matches an index of refraction of the optical fiber.

18. The light transmission system of claim 8, wherein said optical element has a focal point wherein the light has a non-annular intersity profile at the focal point.

19. An optical coupler comprising:
   an optical element having a substantially flat side and a substantially convex side;
   a detector spaced from the convex side of the optical element; and
   an optical fiber positioned adjacent to the substantially flat side of the optical element wherein the substantially flat side of the optical element is oriented perpendicular to an optical axis associated with the optical coupler and the optical element is adapted to direct light delivered by the optical fiber to the spaced detector such that light that is reflected by the detector does not substantially couple back into the optical fiber wherein the substantially convex side has a slope discontinuity that is located proximate the optical axis.

20. The optical coupler of claim 19, wherein the slope discontinuity comprises a curvature discontinuity of the substantially convex side.

* * * * *